Oct. 12, 1937.  R. A. HART ET AL  2,095,698
OX YOKE MODEL
Filed May 29, 1936
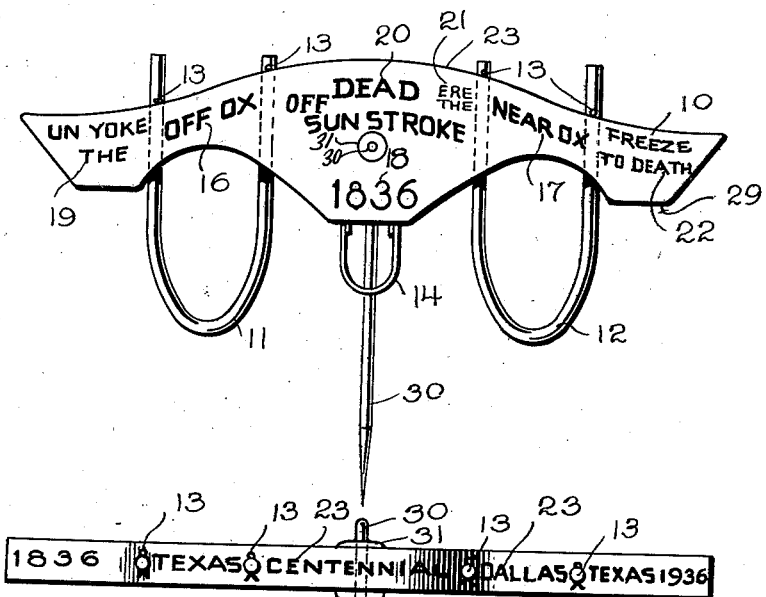
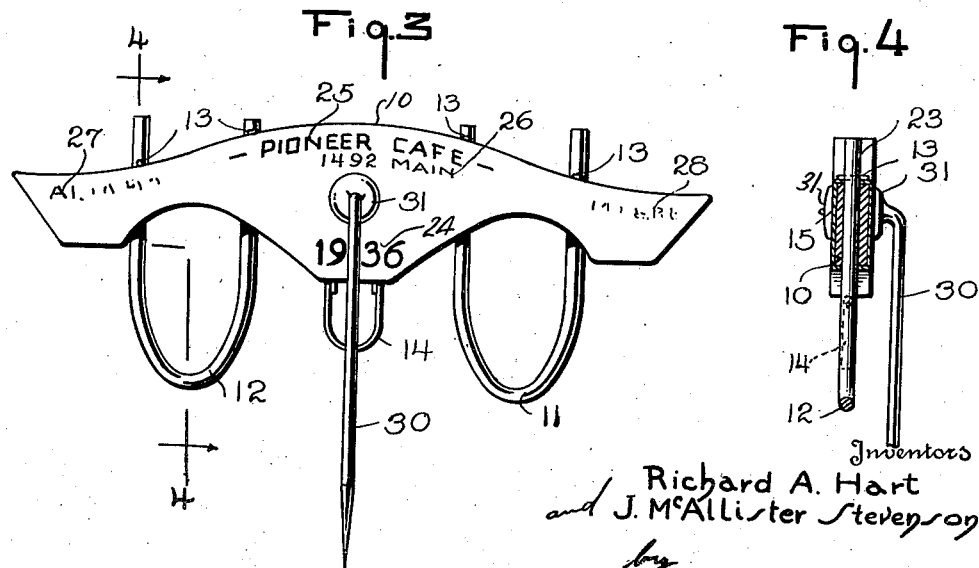
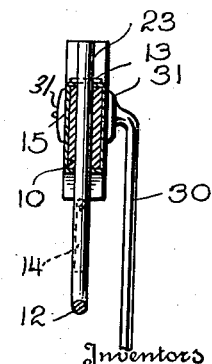

Patented Oct. 12, 1937

2,095,698

UNITED STATES PATENT OFFICE 2,095,698

OX YOKE MODEL

Richard A. Hart and John McAllister Stevenson, Taylor County, Tex.

Application May 29, 1936, Serial No. 82,614

3 Claims. (Cl. 40—1.5)

Our invention relates to advertising novelties for distribution to promote the business of the advertiser, and in particular to that class of advertising novelties which are acceptable and desired on account of the interest they tend to excite rather than any particular utility as implements.

The class of advertising novelties to which our invention relates may be summarized under the term of models, in that they are shaped to resemble some object in which the distributee is likely to become interested; and, in particular, to resemble such objects as are remainders of times past, and thus adapted for use upon occasions of assemblage in honor of a certain period of time, such as commemorative expositions.

The object of our invention is to provide models of this kind, and to make such models interesting, acceptable, and efficient as advertising by providing appropriate reading matter as part of its appeal, and by correlating same with the reading matter setting forth the advertiser's claims, as hereinafter more fully shown.

A further object of our invention is to provide a continuous label covering several sides of the device on which the reading matter for such sides can be impressed at a single printing, and mechanical means in addition to hold such label more securely.

We do not wish to be limited to the particular form of model set forth, in that we have shown subject matter that is novel and useful, and that may readily be adapted to other forms of models of the class indicated without departing from the scope of our invention, which resides in the novel construction and arrangement of parts hereinafter more fully described, and particularly defined by the claims.

Referring now to the drawing, in which like parts are indicated by like characters, Fig. 1 is a front view in perspective of our device, Fig. 2, a top plan, Fig. 3 is a rear view in elevation of the same, and Fig. 4, a section on line 4—4 of Fig. 3.

In forming our ox yoke model we provide, first, a beam portion, 10, which may be made of wood, through holes in which pass the ox bows, 11 and 12, which may be made of pliable wood, and are located on each side of the vertical center of the model, their upward extending portions being slotted and provided with key pins, 13, to prevent slipping out. At the center of the beam portion is disposed the staple, hasp, or U-bolt, 14, preferably of metal, for attachment at the bottom to the wagon tongue, not shown.

Between the rounds of each of the ox bows, 11 and 12, the under side of the beam portion, 10, is cut out to make a rounded surface to rest on the necks of the oxen.

The ox yoke model thus comprised conforms substantially to the type of ox yoke formerly in general use.

To attach the advertising matter we prefer to surround the beam portion, 10, with an adhesive label, 15, of which the ground shall be in a color, such as yellowish brown, or yellow, to simulate the color of natural wood, and the lettering in some contrasting color, such as blue or black. Obviously the label, 15, can be of one piece, consisting of conjoined portions corresponding in order to the front, top, back and bottom of the beam portion, 10.

On the front portion we first print the designations, 16 and 17, of the two yoke fellows, placing each designation between the rounds of an ox bow. Since the spectator is obviously looking at the device from the front, such designations will serve to indicate, and recall to mind, which ox is which, according to the conventional designations.

Centrally, and at the lowest part of the beam portion, on the front portion of the label, 15, we place a date, 18, referring to a past time when such ox yokes were in general use. Then along the central portion of the width of the beam, 10, in general alinement with the designations, 16 and 17, we place upon the label, 15, the wordings, 19, 20, 21 and 22, so that reading from left to right a sentence will be formed to include the designations, 16 and 17. This sentence, when completed, will be found to contain an outrageous exaggeration of weather conditions, and of sudden change in weather conditions, and is derived from an oft told tale of the nature of folk lore.

On the top portion of the label, 15, is placed a statement, 23, of the commemorative exposition for which the device may be used as a souvenir.

On the back portion of the label, 15, is placed centrally at the bottom a date, 24, referring to the present, and corresponding to the date, 18, upon the front portion. Toward the top of the back portion are placed the advertiser's name, 25, and address, 26, both wholly imaginary as shown, and thereunder, reading from left to right, in alinement, are, first, a statement, 27, of what is advertised, and, second, a statement, 28, indicating promptness and readiness of the advertiser to serve the public.

Upon the bottom portion of the label, 15, may be placed the maker's name, and such notices as may be required by law.

An outrageous exaggeration such as that shown upon the front will serve to attract attention to the model as a whole, and make it acceptable, as comprising something to remember, and to interest and amuse others in turn. The subject matter to be advertised by statement, 27, will naturally be something which involves protection from the weather, and from such extreme and sudden conditions as are suggested upon the front. Such subject matter could be clothing, shelter, such as hotels, transportation, air conditioning, heating for homes, or whatever would suggest some relation to the weather and to protection therefrom.

The statement, 28, being, as shown, correlated to the matter of suddenness indicated by the outrageous exaggeration, the two statements, 27 and 28, combine to correlate the advertiser's offering as to protection, and as to comfort, and as to promptness and readiness to serve, with the extreme conditions, and with the suddenness, both indicated by the outrageous exaggeration.

In order that the model as a whole may be worn upon the person as an ornament, we provide same at its center with a rearwardly and downwardly extending pin, 30, fastened in the usual manner by means of collars, 31, one bearing on a swaged shoulder, and the other retained by the riveted end of the pin. Each of the collars, 31, bears against the label, 15, so that both combine to hold it more securely to the beam portion, 10.

It is obvious that any number of suitable materials may be substituted for those indicated; and that many obvious equivalents may be used, and modifications made in our device, without departing from the scope of our invention, as the same is hereinafter defined in the claims.

What we claim as new, and desire to secure by Letters Patent of the United States of America, is:

1. An advertising novelty in the form of a stick pin comprising a member in the form of well known apparatus, a continuous label of fabric covering the front and rear sides of the body portion of said member, a pin having a portion passing through the said body portion from front to rear, collars on said pin bearing against said covering at front and rear of said body portion, and legends on said covering at the front and rear faces of said body portion.

2. An advertising novelty in the form of a stick pin comprising a member in the form of an ox yoke, a continuous label of fabric covering the front and rear sides of the body portion of said yoke, bows passing through the major diameter of said body portion, a pin having a portion passing through said body from front to rear, collars on said pin bearing against said covering at front and rear of said body portion, and legends on said covering at the front, rear and upper faces of said body portion.

3. An advertising novelty in the form of a stick pin comprising a member in the form of an ox yoke, a continuous label of paper covering the body portion of the yoke, bows passing through the major diameter of the said body portion, a hasp secured to the under face thereof, a pin having a portion passing through said body from front to rear, collars on said pin bearing against said covering at front and rear of said body portion, and legends on said covering at the front, rear and upper faces of said body portion.

RICHARD A. HART.
J. McALLISTER STEVENSON.